US012640929B2

(12) United States Patent <br> Sethia et al.

(10) Patent No.: US 12,640,929 B2 <br> (45) Date of Patent: May 26, 2026

(54) SECURE VALIDATION OF SPATIAL COMPUTING DATA TRANSMITTED OVER SPINE-LEAF NETWORK USING HOMOMORPHIC SERPENT CRYPTOGRAPHIC ALGORITHM

(71) Applicant: Bank of America Corporation, Charlotte, NC (US)

(72) Inventors: Maneesh Kumar Sethia, Hyderabad (IN); Saurabh Garg, Faridabad (IN); Shailendra Singh, Thane (IN)

(73) Assignee: Bank of America Corporation, Charlotte, NC (US)

( * ) Notice: Subject to any disclaimer, the term of this patent is extended or adjusted under 35 U.S.C. 154(b) by 128 days.

(21) Appl. No.: 18/645,435

(22) Filed: Apr. 25, 2024

(65) Prior Publication Data

US 2025/0337588 A1     Oct. 30, 2025

(51) Int. Cl.
    *G06F 21/64*        (2013.01)
    *H04L 9/32*         (2006.01)

(52) U.S. Cl.
    CPC ............ *H04L 9/3236* (2013.01); *G06F 21/64* (2013.01)

(58) Field of Classification Search
    CPC ............................... H04L 9/3236; G06F 21/64
    See application file for complete search history.

(56) References Cited

U.S. PATENT DOCUMENTS

| | | | |
|---|---|---|---|
| 10,579,830 B1 * | 3/2020 | Bendersky ............ | G06F 21/602 |
| 11,068,488 B2 * | 7/2021 | Rayaroth Koderi ......................... G06F 16/24568 | |

| | | | |
|---|---|---|---|
| 11,425,221 B1 * | 8/2022 | Henkel ................ | H04L 41/145 |
| 2018/0113883 A1 * | 4/2018 | Duan ................... | G06F 16/9027 |
| 2019/0386913 A1 * | 12/2019 | Wei ........................ | H04L 47/125 |
| 2020/0100108 A1 * | 3/2020 | Everson ............. | H04W 12/041 |
| 2022/0255763 A1 * | 8/2022 | Campbell ............. | H04L 9/3239 |

(Continued)

OTHER PUBLICATIONS

Sk. K. Shareef et al. Enhancement of Blockchain System in Online Transaction by Detecting Attacks Using an Intelligent Approach. Recurrent Neural with Serpent Encryption (RNxSE). Int. J. Comp. Dig. Systems, v. 12, pp. 867-876 (Year: 2022).*

(Continued)

*Primary Examiner* — Lynn D Feild
*Assistant Examiner* — Vladimir I Gavrilenko
(74) *Attorney, Agent, or Firm* — Weiss & Arons LLP

(57) ABSTRACT

A method for validating a data transmission pathway between two organizations across a spine-leaf network may use two cryptographic algorithms to validate the pathway. Data used to validate the pathway may include spatial computing telemetry. Once validated, sensitive data may be transmitted over the pathway. The spine-leaf network may receive one hash value encrypted by a homomorphic encryption algorithm run by an organization and another hash value encrypted by a serpent encryption algorithm run by a separate organization. A processor running in the spine-leaf network may validate an integrity of the data transmission pathway by comparing the two hash values to see if they are equivalent. When the hash values are equivalent, the pathway may be validated, and the sensitive data may be transmitted between the two organizations. The sensitive data may be transmitted as ciphertext. The sensitive data may include spatial computing telemetry.

8 Claims, 6 Drawing Sheets

(56)             References Cited

U.S. PATENT DOCUMENTS

| | | | |
|---|---|---|---|
| 2022/0261491 A1* | 8/2022 | Hieronimi | G06F 21/602 |
| 2023/0368878 A1* | 11/2023 | Molenda | G16H 70/60 |
| 2024/0249369 A1* | 7/2024 | Macaluso | G06Q 10/40 |
| 2024/0303354 A1* | 9/2024 | Frankel | H04L 63/0428 |
| 2024/0377822 A1* | 11/2024 | Fang | G05D 1/101 |
| 2025/0165226 A1* | 5/2025 | Roper, Jr. | G06N 3/045 |

OTHER PUBLICATIONS

Karthikeyan Nagaraj, "A Comprehensive Guide to Serpent Encryption: A Powerful Cipher for Securing Your Data-2023," https://cyberwlng.medium.com/a-comprehensive-guide-to-serpent-encryption-a-powerful-cipher-for-securing-your-data-2023-61e8f5957880, Mar. 10, 2023.
Shareef et al., "Enhancement of Blockchain System in Online Transaction by Detecting Attacks Using an Intelligent Approach Recurrent Neural with Serpent Encryption (RNwSE)," https://dx.doi.org/10.12785/ijcds/120172, Oct. 31, 2022.
Cathy Hackl, "CES 2024: What Is Spatial Computing?" https://www.forbes.com/sites/cathyhack1/2024/01/06/what-is-spatial-computing/?sh=199bd773360e, Jan. 6, 2024.

* cited by examiner

SECURE VALIDATION OF SPATIAL COMPUTING DATA TRANSMITTED OVER SPINE-LEAF NETWORK USING HOMOMORPHIC SERPENT CRYPTOGRAPHIC ALGORITHM

FIELD OF TECHNOLOGY

Aspects of the disclosure relate to validating spatial computing data over a network.

BACKGROUND OF THE DISCLOSURE

Spatial computing may be an emerging technology. Electronic product companies may be releasing their spatial computing wearable devices that blend digital content with the physical world, while allowing users to stay present and connected to others. As these products make their way into the consumer markets, there may be demand from consumers to initiate data transmission using a spatial computing device. An example of data transmission may be a transaction. There may be a demand to use banking applications leveraging the spatial computing device the consumer is wearing. There may be a need to develop an apparatus and method that secures transactions and protects data privacy on a spatial computing infrastructure.

SUMMARY OF THE DISCLOSURE

Provided may be apparatus and methods for validating a data transmission pathway for spatial computing between two organizations across a spine-leaf network using cryptographic algorithms. The cryptographic algorithms may encrypt data such as telemetric data relating to spatial computing.

A processor of an organization may receive a first data set from a party. The organization may receive the first data set when the party requests that the organization transmit a second data set to another organization. The first data set may serve to validate the data transmission pathway. The second data set may be a more complete set of data than the first data set. The second data set may include a transaction.

The processor may run a homomorphic encryption algorithm to encrypt the first data set into a hash value.

A request by the party for transmission of the second data set by the party may prompt a processor of the other organization to run a serpent encryption algorithm to encrypt a third data set into a hash value. The serpent encryption algorithm may include a serpent cipher algorithm.

A processor operating in the spine-leaf network may validate the integrity of the data transmission pathway by comparing the hash values from the first and third data sets to see if they are equivalent. When the hash values are equivalent, the processor operating in the spine-leaf network may transmit the second data set. The second data set may traverse the spine-leaf network. The second data set may travel from one organization to another. The second data set may traverse a spine-leaf network in its travel from one organization to another.

The first data set may include data collected by telemetry relating to the use of a spatial computing device by the party. The third data may include the first data set. The third data may be equivalent to the first data set.

Validation of the data transmission pathway between the two organizations over the spine-leaf network may utilize the first data set and the third data set. The second data set may include data not included in the first data set. The second data set may include data included in the first data set. The second data set may include both data included in the first data set and data not included in the first data set.

The first data set may be in ciphertext before the homomorphic encryption algorithm encrypts the first data set into a hash value.

The third data set may be in ciphertext before the serpent encryption algorithm encrypts the third data set into a hash value.

The first data set may include plain text. The homomorphic encryption algorithm may convert the first data set into ciphertext. The homomorphic encryption algorithm may encrypt the first data set into a hash value. The homomorphic encryption algorithm may convert the first data set from plain text into a hash value. The homomorphic encryption algorithm may convert the first data set from plain text into ciphertext, and then from ciphertext to a hash value. The homomorphic encryption algorithm may encrypt the first data set with the use of a key. The key may be a private key. The key may be a public key. The homomorphic encryption algorithm may decrypt the encrypted first data set with the use of a private key.

The third data set may include plain text. The serpent encryption algorithm may convert the third data set into ciphertext. The serpent encryption algorithm may encrypt the third data set into a hash value. The serpent encryption algorithm may convert the third data set from plain text into a hash value. The serpent encryption algorithm may convert the third data set from plain text into ciphertext, and then from ciphertext to a hash value. The serpent encryption algorithm may encrypt the third data set with the use of a key. The key may be a private key. The key may be a public key. The serpent encryption algorithm may decrypt the encrypted first data set with the use of a private key.

The third data set may be obtained from a distributed ledger that contains telemetry data relating to the initiating party.

The data transmission pathway may be an end-to-end data transmission pathway. End-to-end may include selected functionality in the network being kept at communication end points such as institutions that communicate through the spine-leaf network. The spine-leaf network may be a network that does not contain the selected functionality. The spine-leaf network may pass data from one enterprise to another.

The data transmission pathway may contain data pertaining to a transaction. The second data set may comprise spatial computing related to an end-to-end transaction between the organizations. The end-to-end transaction may include selected functionality in the network being kept at communication end points such as banks that communicate through the spine-leaf network.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
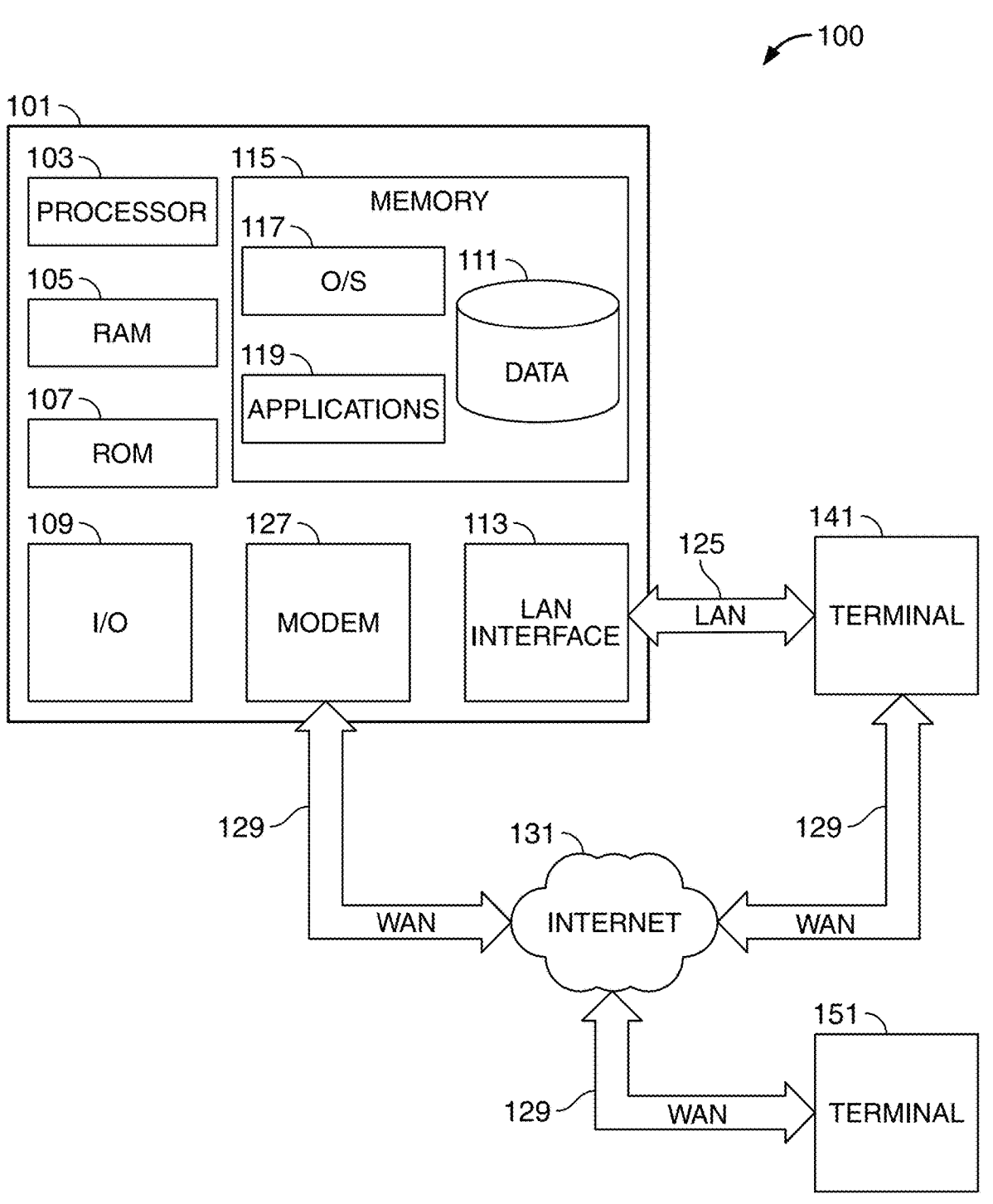
FIG. 1 shows an illustrative block diagram in accordance with principles of the disclosure.

Provided may be apparatus and methods for validating a data transmission pathway for spatial computing between two organizations across a spine-leaf network using cryptographic algorithms. Cryptographic algorithms may encrypt data relating to spatial computing such as data collected by telemetry.

The apparatus may include a system. The system may include a processor of an organization. The system may include a processor of a receiving organization. The system may include a spine-leaf network. The system may include a third processor operating in the spine-leaf network.

The spine-leaf network may include a spine-leaf architecture. The spine-leaf network may have a physical and logical arrangement of nodes and connections that consists of two switching layers, a spine and leaf. The leaf layer may consist of access switches that aggregate traffic from servers and connect directly into the spine or network core. Spine switches may interconnect all leaf switches such that each node is directly connected to all the other nodes.

This may be a two-layer full-mesh network topology. The two-tier topology may be composed of spine switches and leaf switches. Leaf switches may connect to spine switches and mesh into the spine, forming the access layer that delivers network connection points for servers. Servers and storage may connect to leaf switches and consist of access switches that aggregate traffic from servers. They may connect directly to the spine. Every leaf switch in a spine-leaf architecture may connect to every switch in the network fabric.

Spine-leaf may minimize latency and bottlenecks because each payload only travels to a spine switch and to another leaf switch to reach its endpoint. Spine switches may have high port density and form the core of the architecture. Switches in a spine-leaf architecture may also help in scaling, as multiple switches can be used in a data center switching architecture.

The spine-leaf network may be used to route inquires made by spatial computing and telemetry relating to spatial computing. The spine-leaf network may trigger an end-to-end data transmission pathway between enterprises. A spine-leaf network may be used for transactions between bank institutions. The transaction may be a peer-to-peer transaction between the bank institutions. The transaction may be an end-to-end transaction between the bank institutions.

Spatial computing may be a broad concept that combines the physical world with virtual content. This process may enable digital objects to exist and interact with the physical environment as if they were there, even allowing the user to interact with the digital objects.

Spatial computing may include a human and computer interaction technique that is perceived by users as taking place in the real world that is in and around their natural bodies and physical environments, instead of constrained to and perceptually behind computer screens.

Components of spatial computing may include camera sensors such as light detection and ranging ("LIDAR"), internet of things, digital twins, ambient computing, augmented reality ("AR"), virtual reality ("VR"), artificial intelligence ("AI"), and physical controls. Advancements in these technologies may contribute to making spatial computing more feasible.

Some items that may contribute to the spine-leaf network include an authorization server ("auth server"), a secure access service edge (SASE), micro segmentation, generative artificial intelligence ("AI"), and administration ("admin").

The auth server may authorize the execution of data transmission when two hash values match, e.g., hash values generated by different enterprises cryptographic algorithms. The data transmission may be an execution of a payment.

SASE may orchestrate secure access to enterprise nodes. When the data transmission is a payment, the enterprise nodes may be bank nodes.

Micro segmentation may divide the network into small segments to enhance security and control. Implementing micro segmentation may ensure network resilience.

Generative AI may divide the network into small segments, such as micro segmentation, based on spatial computing and telemetry relating to spatial computing. Generative AI may look at data size patterns so that security of data is ensured.

Admin may provide network controls. Admin may provide monitoring of performance of the spine-leaf network.

The spine-leaf network may use one or more of these items to function.

The processor may be configured to receive a first data set from a party when the party requests that the organization transmit a second data set to the receiving organization. The first data set may serve to validate the data transmission pathway. The second data set may be a more complete set of data than the first data set.

The data transmission pathway may be exposed to risk as a malicious third party may seek to intercept data as it is transported. Validating the data transmission pathway may provide a degree of certainty that the data transmission pathway is secure. Validating the pathway may include validating the integrity of the data transmission pathway. Validating the integrity may include the data that is received containing matching content as the data that was transmitted.

The processor may be configured to run a homomorphic encryption algorithm to encrypt the first data set into a hash value. The hash value may be an irreversible hash value. The hash value may be a reversible encrypted value that is created using a key.

Homomorphic encryption may be using an asymmetric key scheme. Homomorphic encryption may include the conversion of plain text into ciphertext. Ciphertext may be analyzed and worked with as if it were still in its original form, while encrypted to enhance secrecy of the data. Homomorphic encryption may even enable complex mathematical operations to be performed on encrypted data without compromising the encryption.

Homomorphic encryption may involve hashing customer sensitive spatial telemetry information. Homomorphic encryption may create a hash value from ciphertext. Telemetry information may include IP address, Spatial interaction telemetry, Spatial map, and spatial device attributes. This hashing may happen in the ciphertext layer. Ciphertext text layer may be an encrypted layer. Hashing in the ciphertext layer may prevent the telemetry information from being decrypted or processed in plain text form thus preventing potential exposure of the telemetry data.

The receiving processor may be configured to run a serpent encryption algorithm to encrypt a third data set into a hash value when the party requests from the organization to transmit the second data set between the organizations. The serpent encryption algorithm may include a serpent cipher algorithm.

The two hash values may encrypt a similar data sets. The data may include spatial computing telemetry. The spatial computing telemetry may include an IP address, a session time, a spatial interaction telemetry, a spatial map, and a spatial device attributes. These values may be generated at the time when a user requests a transmission of information such as when a customer is executing a payment transaction.

The two hash values may obtain the data they encrypt in different ways.

The hash value from the first data set may be generated at a time when user/customer is requesting a transmission of data such as executing payment on a spatial computing device. To validate a data transmission pathway, spatial telemetry may be extracted. Spatial telemetry data may include an IP address, spatial interaction telemetry, spatial map, and spatial device attributes.

The hash value from the third data set may be generated by an organization of a receiving party based on historical information that may be shared between organizations on distributed ledger such as a blockchain. The receiving party's organization may be a bank. The hash value from the third data set may be generated from stored information.

Serpent encryption may be a symmetric key block cipher. The serpent encryption algorithm may use symmetric, private keys to encrypt plain text in ciphertext and to decrypt ciphertext into plain text. Serpent encryption may have taken a conservative approach to security, by pursuing a large security margin. In contract, the Advanced Encryption Standard ("AES") of the National Institute of Standards and Technology ("NIST") may have pursued a more efficient software implementation with less security margin.

Serpent encryption may include the conversion of plain text into ciphertext. Ciphertext may be analyzed and worked with as if it were still in its original form, while encrypted to enhance secrecy of the data. Serpent encryption may even enable complex mathematical operations to be performed on encrypted data without compromising the encryption.

Serpent encryption may involve hashing customer sensitive spatial telemetry information. Serpent encryption may create a hash value from ciphertext. Telemetry information may include IP address, Spatial interaction telemetry, Spatial map, and spatial device attributes. This hashing may happen in the ciphertext layer. Ciphertext text layer may be an encrypted layer. Hashing in the ciphertext layer may prevent the telemetry information from being decrypted or processed in plain text form thus preventing potential exposure of the telemetry data.

The two hash values may be encrypted by keys. When they are being compared to validate the end-to-end data transmission pathway, the two hash values may be compared, the two hash values may each be partially decrypted to result in ciphertext which may be compared, or the two hash values may be completely decrypted to result in plain text which may be compared.

The third data set may be obtained from a blockchain that contains data about the IP address, a session time, a spatial interaction telemetry, a spatial map, a spatial device attributes, among other data.

A blockchain may be a type of distributed ledger technology (DLT), a digital record-keeping system for recording transactions and related data in multiple places at the same time. Each computer in a blockchain network may maintain a copy of the ledger. The ledger may contain recorded transactions to prevent a single point of failure.

The spatial computing telemetry may reside inside a distributed ledger network such as a blockchain. The spatial device may trigger payment to a bank. A hash containing a customer's spatial computing telemetry may be processed and stored in a distributed ledger such as a blockchain.

A processor may be configured to validate an integrity of the data transmission pathway by comparing the hash values to see if they are equivalent.

A processor may be configured to transmit the second data set when the hash values match.

A hash function may produce a fixed-length output from an arbitrary-length input. A hash function may be collision resistant if it is computationally infeasible to find two distinct inputs which hash to the same output.

A cryptographic hash function ("CHF") may be an equation used to verify the validity of data. One of the applications of CHF may be in information security such as user authentication. A CHF may translate data of various lengths, which may be called the message, into a fixed size numerical string, which may be called the hash. A CHF may be a single direction work, making it extraordinarily difficult to reverse to recreate the information used to make it. CHF may achieve their irreversible property due to being designed to be irreversible.

The first data set may include telemetry data relating to use of a spatial computing device by the party. The third data may include the first data set. The third data may be equivalent to the first data set.

Telemetry data may include the in situ collection of measurements or other data at remote points. Telemetry data may be automatically transmitted to receiving equipment for monitoring, for example, through telecommunication.

Validation of the data transmission pathway between the two organizations over the spine-leaf network may utilize the first data set and the third data set. The second data set may include data not included in the first data set. The second data set may include data included in the first data set. The second data set may include both data included in the first data set and data not included in the first data set.

Data validation may refer to the process of ensuring the accuracy and quality of data. It may be implemented by building several checks into a system or report to ensure the logical consistency of input and stored data. In automated systems, data may be entered with minimal or no human supervision. It may be necessary to ensure that the data that enters the system is correct and meets the desired quality standards. The data may be of little use if it is not entered properly and can create bigger downstream problems.

The first data set may be in ciphertext before the homomorphic encryption algorithm encrypts the first data set into a hash value.

The third data set may be in ciphertext before the serpent encryption algorithm encrypts the third data set into a hash value.

The first data set may include plain text. The homomorphic encryption algorithm may convert the first data set into ciphertext. The homomorphic encryption algorithm may encrypt the first data set into a hash value. The homomorphic encryption algorithm may convert the first data set from plain text into a hash value. The homomorphic encryption algorithm may convert the first data set from plain text into ciphertext, and then from ciphertext to a hash value. The homomorphic encryption algorithm may encrypt the first data set with the use of a key. The key may be a private key. The key may be a public key. The key may be generated by one of the parties sharing the key with the other party or parties not influencing the key. The key may be generated by two or more parties utilizing a key-agreement protocol.

A key-agreement protocol may include two or more parties agreeing on a cryptographic key in such a way that both influence the outcome. A properly executed key agreement may preclude undesired third parties from forcing a key choice on the agreeing parties. The protocol may be designed to avoid revealing to an eavesdropping party what key has been agreed upon. Using a key-agreement protocol may assist in overcoming key distribution problems associated with only one party selecting the key.

Protocols that both parties influence the final derived key may be the only way to implement perfect forward secrecy.

The third data set may include plain text. The serpent encryption algorithm may convert the third data set into ciphertext. The serpent encryption algorithm may encrypt the third data set into a hash value. The serpent encryption algorithm may convert the third data set from plain text into a hash value. The serpent encryption algorithm may convert the third data set from plain text into ciphertext, and then from ciphertext to a hash value. The serpent encryption algorithm may encrypt the third data set with the use of a key. The key may be a private key. The key may be a public key.

The third data set may be obtained from a distributed ledger that contains telemetry data relating to the initiating party.

When the hash values match, the data transmission pathway may be validated. Validation may trigger an end-to-end data transmission pathway between the two organizations that may allow for a larger body of spatial information to be shared. The two organizations may be two banks. The spatial information may include spatial transaction information such as the payment transaction payload and the spatial telemetry attributes. For this process to work, the organizations may need to have data related to spatial computing telemetry about the customer/user such as IP address, spatial interaction telemetry, spatial map, and spatial device attributes. This data may be shared between the organization through a distributed ledger blockchain.

The data transmission pathway may be an end-to-end data transmission pathway. End-to-end may mean that selected functionality in the network may be kept at communication end points such as institutions that communicate through the spine-leaf network. The spine-leaf network may be a network that does not contain the selected functionality. The spine-leaf network may pass data from one enterprise to another.

The data transmission pathway may contain data pertaining to a transaction. The second data set may be transmitted over the data transmission pathway. The second data set may comprise data pertaining to a transaction and data related to spatial computing between the two organizations.

The data transmission pathway may be an end-to-end data transmission pathway. Spatial computing that is secure may be used to initiate a financial transaction. Spatial computing that is secure may be used to initiate data transmission. A customer's transaction payload and spatial computing telemetry may be used to validate the data transmission pathway. The customer's transaction payload may be securely transmitted once the data transmission pathway has been validated. This validation may use a homomorphic encryption algorithm. This validation may use a serpent cryptographic algorithm. The customer's transaction payload may be securely transmitted and validated using a homomorphic serpent cryptographic algorithm.

These algorithms may be used within a framework of a homomorphic serpent blockchain ("HSB") algorithm. The HSB algorithm may be a process which uses homomorphic serpent encryption to hash the customer's sensitive spatial telemetry information such as IP address, session time, spatial interaction telemetry, spatial map, and spatial device attributes. The data related to spatial computing telemetry may reside inside a distributed ledger network such as a blockchain. The HSB algorithm may be executed using a python platform. The HSB algorithm may utilize the homomorphic encryption algorithm to create a hash value and the serpent cryptographic algorithm to create another hash value, both using the same spatial telemetry information. When the hash values match, then an end-to-end data transmission pathway may be validated.

The HSB algorithm may provide higher security than other conventional algorithms. Convention algorithms may include the contraction hierarchies ("CH") algorithm, the modified elliptical curve cryptography ("MECC") algorithm, and the Rivest-Shamir-Adleman ("RSA") algorithm. CH may be a cryptosystem. MECC may be a cryptosystem. RSA may be a cryptosystem.

The HSB algorithm may operate on a conventional processor. The HSB algorithm may operate on a quantum computer.

Apparatus and methods may be described herein are illustrative. Apparatus and methods may be in accordance with this disclosure will now be described in connection with the figures, which form a part hereof. The figures may show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

When the hash values match, the data transmission pathway may be validated. Validation may trigger an end-to-end data transmission pathway between the two organizations that may allow for a larger body of spatial information to be shared. The two organizations may be two banks. The spatial information may include spatial transaction information such as the payment transaction payload and the spatial telemetry attributes. For this process to work, the organizations may need to have data related to spatial computing telemetry about the customer/user such as an IP address, spatial interaction telemetry, a spatial map, and spatial device attributes. This data may be shared between the organization through a distributed ledger blockchain.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all the elements and apparatus of system 100.

Computer 101 may have a processor 103, including a central processing unit ("CPU"), for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components, such as graphics processing unit ("GPU"), EEPROM, Flash memory, neural-network processing elements, or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network interface 113. System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network ("LAN") 125 and a wide area network ("WAN") 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that network connections shown are illustrative and other means of establishing a communications link between computers may be used. The existence of various well-known protocols such as TCP/IP, Ethernet, FTP, HTTP, and the like may be presumed, and the system may be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Programs may include routines, programs, objects, components, data structures, etc., that perform tasks or implement abstract data types. A computing system may be operational with distributed computing environments. Tasks may be performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Programs may include routines, programs, objects, components, data structures, etc., that perform tasks or implement data types. The invention may also be practiced in distributed computing environments. Tasks may be performed by remote processing devices that are linked through a communications network. In a distributed computing environment, programs may be in both local and remote computer storage media including memory storage devices. It should be noted that such programs may be considered for the purposes of this application as engines with respect to the performance of the tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. Differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
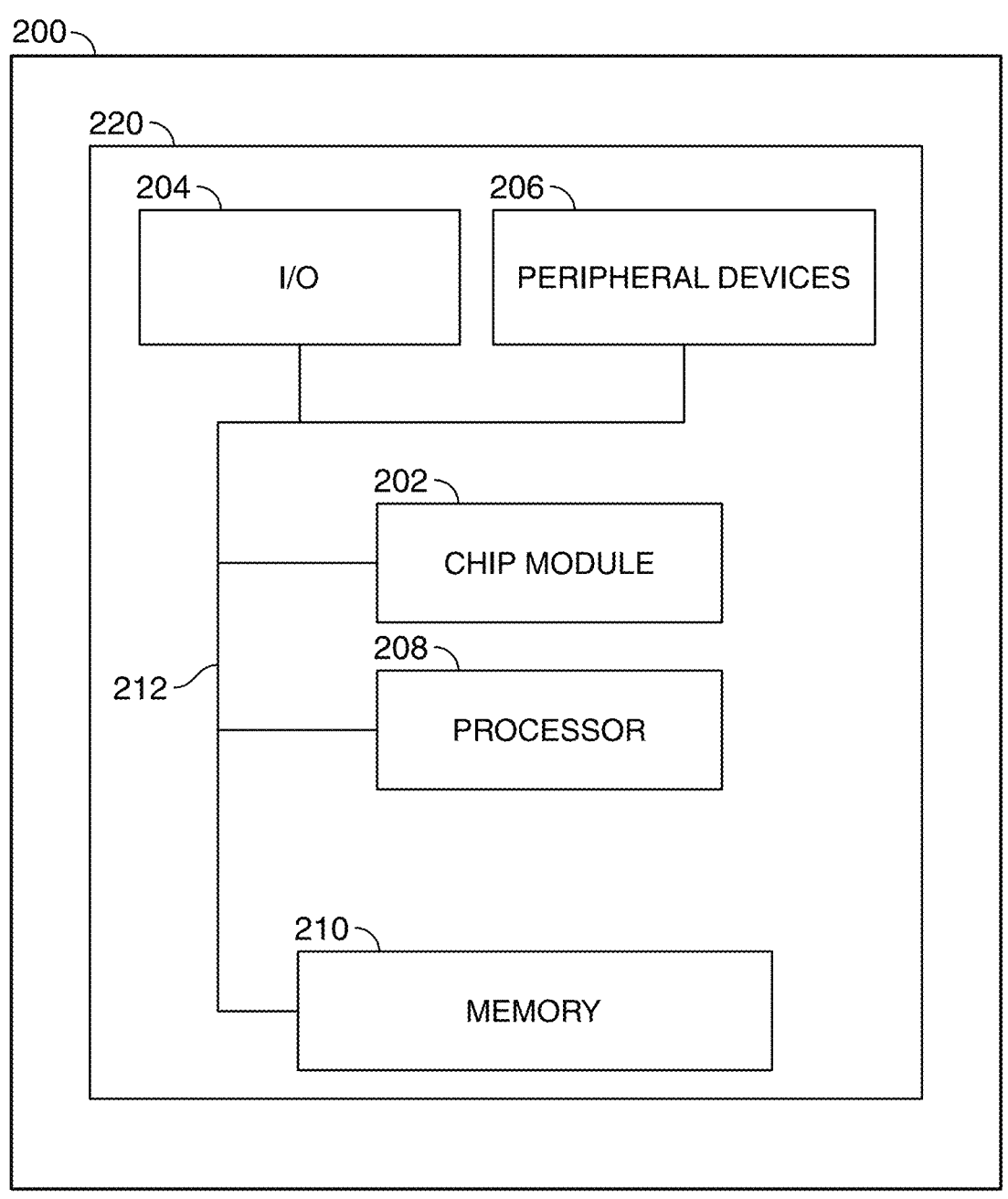
FIG. 2 shows an illustrative block diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, that may include one or more integrated circuits, and that may include logic configured to perform any other suitable logical operations.

Apparatus 200 may include one or more of the following components: I/O circuitry 204, that may include a transmitter device and a receiver device and may interface with fiber optic cable, coaxial cable, telephone lines, wireless devices, PHY layer hardware, a keypad/display control device or any other suitable media or devices; peripheral devices 206, that may include counter timers, real-time timers, power-on reset generators or any other suitable peripheral devices; logical processing device 208, that may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119 (shown in FIG. 1), signals, and/or any other suitable information or data structures.

A system bus or other interconnections 212 may couple components 202, 204, 206, 208 and 210 and may be present on one or more circuit boards such as circuit board 220. In some embodiments, a single chip may integrate the components. The chip may be silicon-based.

Figure 3:
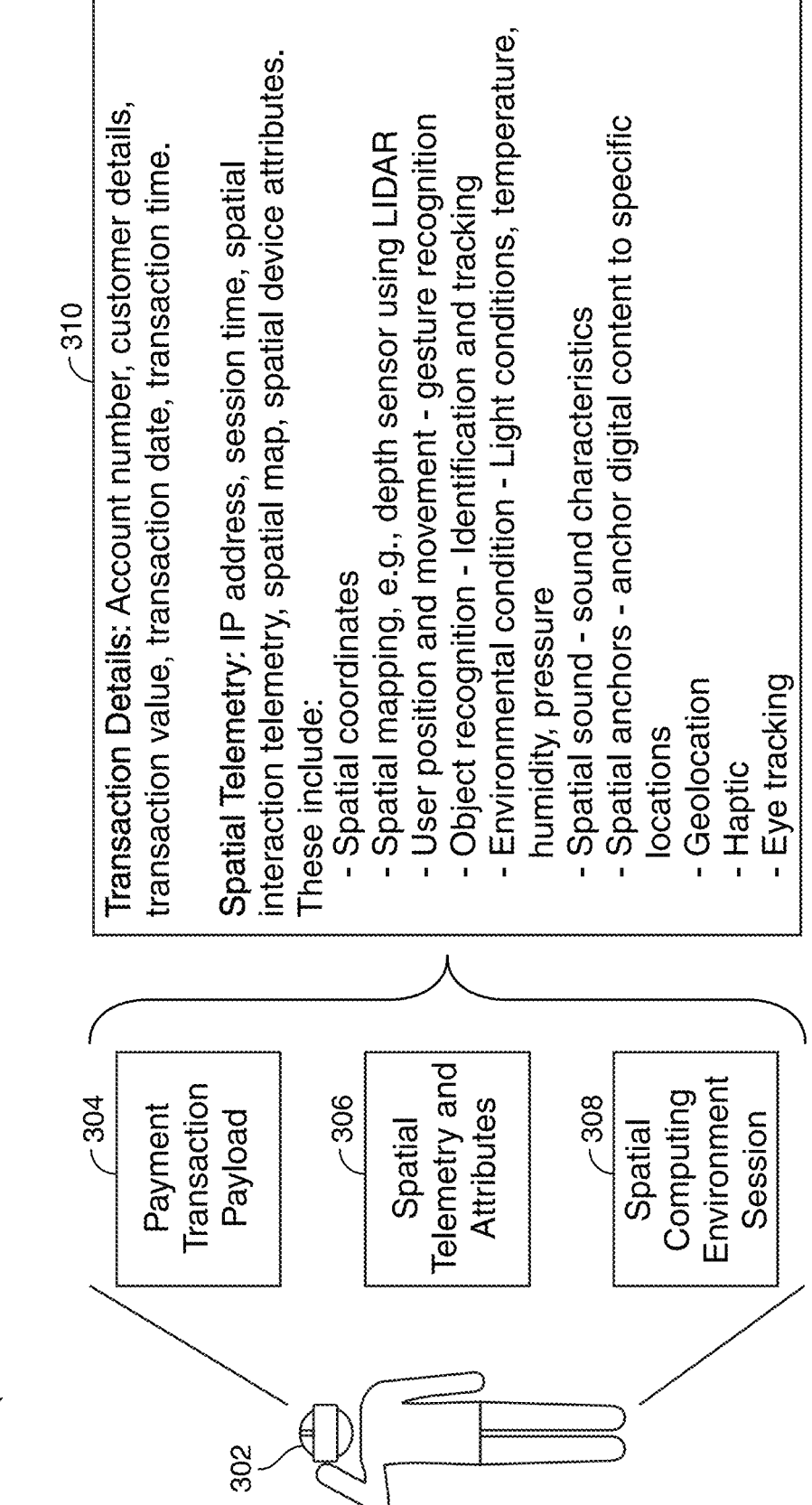
FIG. 3 shows an illustrative block diagram in accordance with principles of the disclosure.

FIG. 3 shows illustrative block diagram 300. Illustrative block diagram 300 may show an apparatus for securing data transmission using spatial computing. Spatial computing may be used to process secure financial transactions. Spatial computing may be used to process secure data transmission. A customer's transaction payload may be integrated with spatial computing telemetry generated for a defined spatial session window. The customer's transaction payload may be validated and securely transmitted using a homomorphic encryption algorithm. The customer's transaction payload may be validated and securely transmitted using a serpent cryptographic algorithm. The customer's transaction payload may be validated and securely transmitted using a homomorphic serpent cryptographic algorithm. These algorithms may be used within a framework of a homomorphic serpent blockchain.

A customer using spatial computing device 302 may initiate a request for a transaction. Data related to the transaction may include payment transaction payload 304. Data related to the transaction may include spatial telemetry payment transaction payload 306. Data related to the transaction may include spatial telemetry payment transaction payload 308.

Examples of transaction payload 304, spatial telemetry payment transaction payload 306, and spatial telemetry payment transaction payload 308 may be found in box 310. Box 310 may include transaction details and spatial telemetry.

Transaction details may include account number, customer details, transaction value, transaction date, and transaction time.

Spatial telemetry may include spatial coordinates, spatial mapping such as depth sensor using light detection and ranging (LIDAR), user position and movement such as gesture recognition, object recognition such as identification and tracking, environmental conditions such as light conditions, temperature, humidity, and pressure, spatial sound characteristics, spatial anchors that anchor digital content to specific locations, geolocation, haptic such as applying forces, vibrations or motion to the user, and eye tracking.

End-to-end payments on the data transmission pathway over a spine-leaf network may include transmitting transaction details, spatial telemetry, or both transaction details and spatial telemetry.

Figure 4:
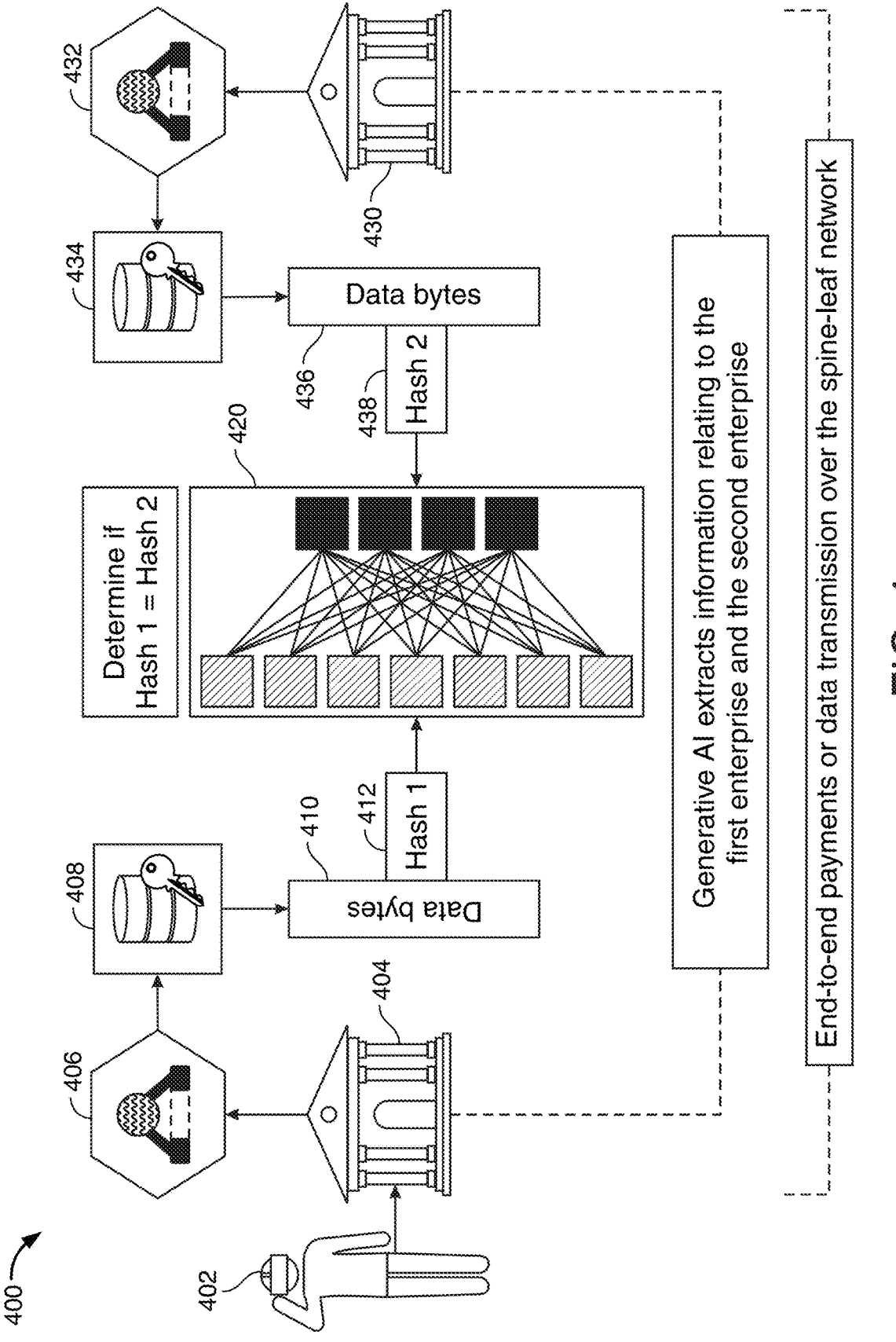
FIG. 4 shows an illustrative block diagram in accordance with principles of the disclosure.

FIG. 4 shows illustrative block diagram 400. Illustrative block diagram 400 may show an apparatus for end-to-end payments on the data transmission pathway over the spine-leaf network. A user or customer may initiate a request for data transmission such as a transaction using spatial computing device 402.

Banking institution 404 may receive the request for data transmission related to a transaction. The request may include transaction details and spatial telemetry. The full set of data that includes both transaction details and spatial telemetry may be shortened to serve as a data set used to validate the end-to-end data transmission pathway. Validating the end-to-end data transmission pathway may include validating the integrity of the data by comparing the data set that was transmitted to the data set that was received to see if they match. This validation data set may be encrypted to obtain ciphertext 406.

Ciphertext 406 may increase security as interception of ciphertext by a third party may render them data that is not understandable. Homomorphic encryption algorithm 408 may be used to change plain text obtained from spatial computing device 402 into ciphertext 406. Homomorphic encryption algorithm 408 may be used to create data bytes 410. Homomorphic encryption algorithm 408 may be used to create hash 1 412. Hash 1 412 may be created with keys. Hash 1 412 may be converted back to ciphertext 406 with the use of keys. Ciphertext 406 may be decrypted back into plain text. Hash 1 412 may be provided to spine-leaf network 420.

Banking institution 430 may receive the request for data transmission related to a transaction. Before sending data or receiving data related to the transaction, banking institution 430 may validate the end-to-end data transmission pathway with banking institution 404. A subset of the full data set for data transmission may be used in the validation process. Other data that is not included in the data transmission request may be used in the validation process. The data used to validate the end-to-end data transmission pathway may be obtained from a blockchain that contains the data. The blockchain may be shared between banking institution 404 and banking institution 430.

Ciphertext 432 may increase security as interception of ciphertext by a third party may render them data that is not understandable. Serpent encryption algorithm 434 may be used to change the validation data set into ciphertext 432. Serpent encryption algorithm 434 may be used to create data bytes 436. Serpent encryption algorithm 434 may be used to create hash 2 438. Hash 2 438 may be created with keys. Hash 2 438 may be converted back to ciphertext 432 with the use of keys. Ciphertext 432 may be decrypted back into plain text. Hash 2 438 may be provided to spine-leaf network 420.

Spine-leaf network 420 may compare hash 1 412 to hash 2 438 to see if they match. If the hash values match, then the integrity and security of the data transmission process may be validated. Once validating the integrity and security of the data transmission process, data transmission of the full data set may be initiated. Generative artificial intelligence ("AI") may be used to extract information related to customer source and destination. The customer source may be spatial computing device 402, banking institution 404, or both. The destination may be banking institution 430. The generative AI may provide an optimal route or path for a transaction, such as a payment, or for a transmission of data.

Figure 5:
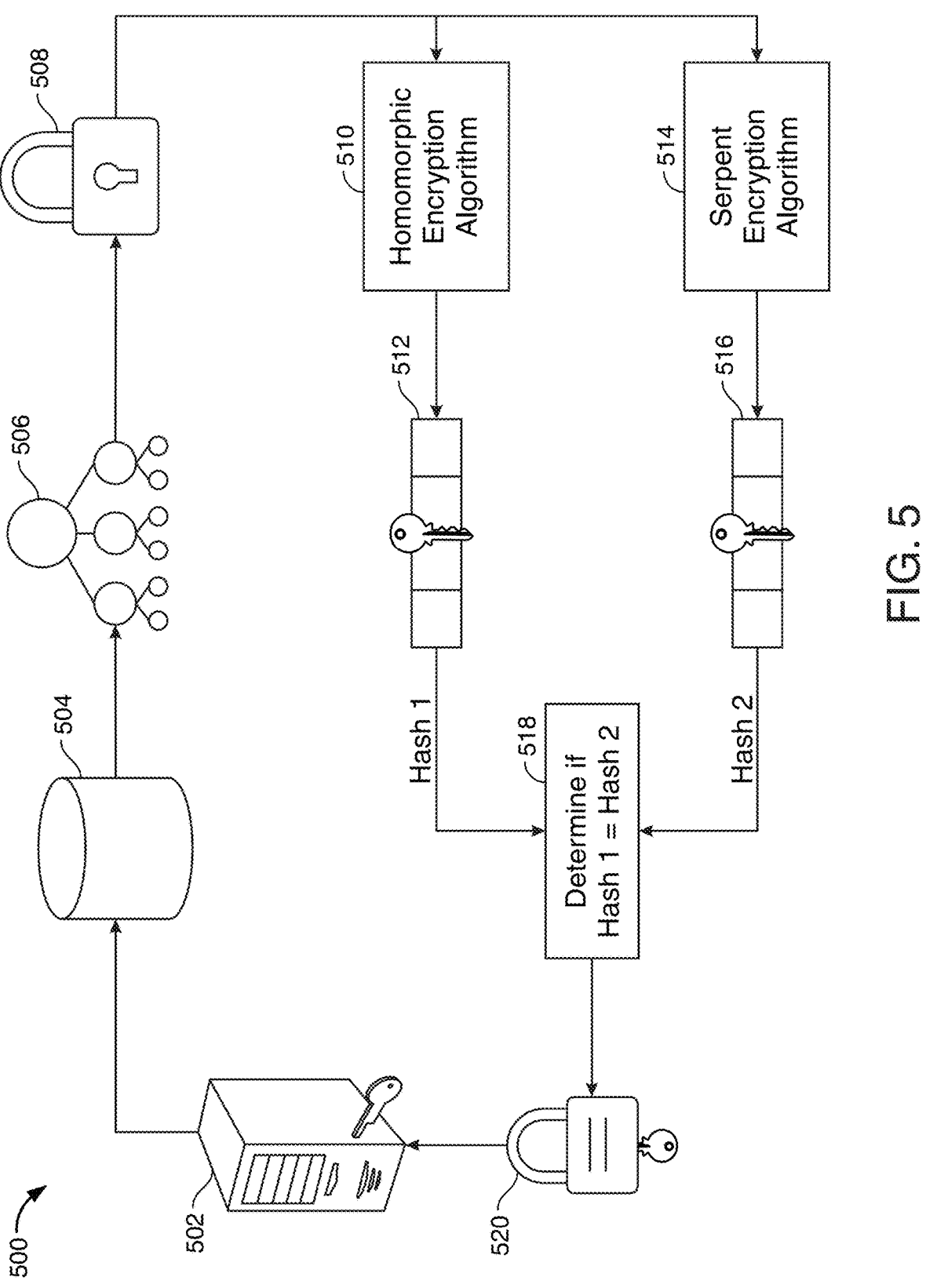
FIG. 5 shows an illustrative block diagram in accordance with principles of the disclosure.

FIG. 5 shows illustrative block diagram 500. Illustrative block diagram 500 may show an apparatus for validation of a data transmission pathway. The apparatus may show an intelligent apparatus to validate and securely transmit spatial computing data. The apparatus may leverage a homomorphic serpent cryptographic algorithm.

A party may want to transmit secure data 502 across a network such as a spine-leaf network. Generative AI may be used to extract data 504. Date 504 may be in the form of bytes. Homomorphic serpent blockchain algorithm 506 may be used to validate a data transmission pathway across the network such as a spine-leaf network.

Encryption 508 may change the plain text into ciphertext.

Homomorphic encryption algorithm 510 may encrypt the ciphertext into encrypted data 512. The encryption may utilize a key or keys such as a private key and a public key. Encrypted data 512 may be a hash value such as hash 1.

Serpent cryptographic algorithm 514 may encrypt the ciphertext into encrypted data 516. The encryption may utilize a key or keys such as a private key and a public key. Encrypted data 516 may be a hash value such as hash 2.

The hash values created by the homomorphic encryption algorithm 510 and serpent encryption algorithm 514 may be compared to provide validation 518 of a secure data transmission such as across a spine-leaf network. If hash 1 matches hash 2, then the data transmission pathway may be validated. When hash 1 matches hash 2, the integrity of the end-to-end transmission pathway may be validated. The data transmission pathway may be an end-to-end data transmission pathway. The end-to-end data transmission pathway may traverse a spine-leaf network.

When the data transmission pathway is validated, the data may be transmitted across the network such as the spine-leaf network. When the data is transmitted, the data may be unencrypted to provide unencrypted data 520.

Figure 6:
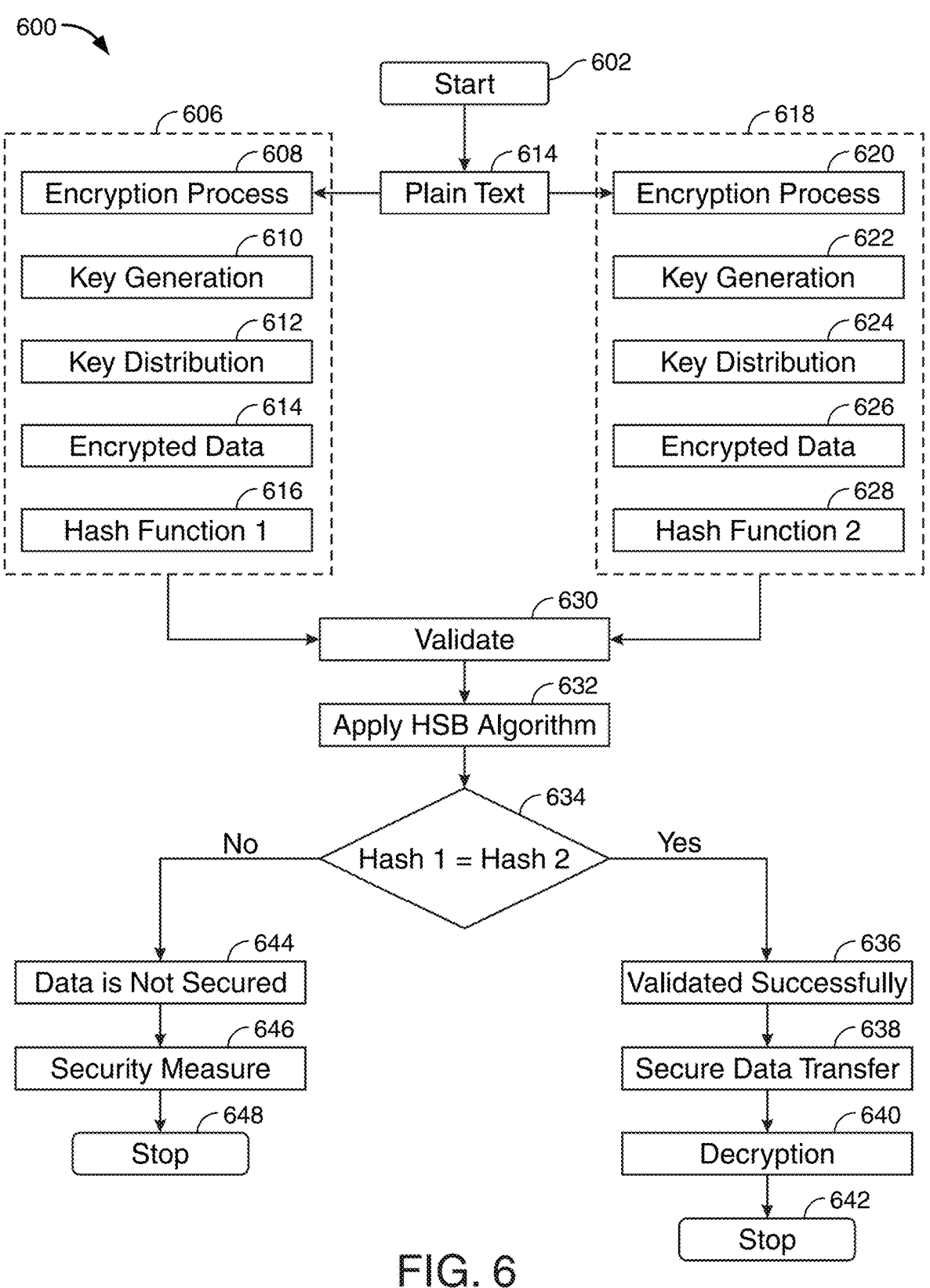
FIG. 6 shows an illustrative flowchart in accordance with principles of the disclosure.

FIG. 6 shows illustrative flowchart 600. Illustrative flowchart 600 may show a process for validating a data transmission pathway. The process may start at step 602. At step 604, a party using a spatial computing device may seek to transmit plain text data across a network. At step 606, a homomorphic encryption algorithm may receive the plain text.

At step 608, the homomorphic encryption algorithm may encrypt the plain text into ciphertext. At step 610, the homomorphic encryption algorithm may generate an encryption key. At step 612, the homomorphic encryption algorithm may distribute an encryption key.

At step 614, the homomorphic encryption algorithm may encrypt the ciphertext into a hash value using the hash function at step 616. The hash value determined at step 616 may be provided to processor 630 for comparison to a second hash value, hash 2, once the latter becomes available.

At step 618, a serpent encryption algorithm may receive the plain text.

At step 620, the serpent encryption algorithm may encrypt the plain text into ciphertext. At step 622, the serpent encryption algorithm may generate an encryption key. At step 624, the serpent encryption algorithm may distribute an encryption key.

At step 626, the serpent encryption algorithm may encrypt the ciphertext into a hash value using the hash function at step 628. The hash value determined at step 628 may be provided to processor 630 on a spine-leaf network to compare hash 1 with hash 2.

Homomorphic serpent blockchain algorithm 632 may be used to determine if hash 1 and hash 2 are identical at step 634. If so, then the data transmission pathway may be validated at step 636. At step 638, the validated data transmission pathway may be used to secure a transmission of data in ciphertext. At step 640, the ciphertext data may be decrypted. The process may be completed at step 642.

If hash 1 and hash 2 are not identical, then, at step 644, the data transmission pathway may not be secured. At step 646, a security measure may be initiated to troubleshoot why the hash values did not match. The process may be completed at step 648.

Thus, provided may be systems and methods relating to validation of a data transmission pathway over a spine-leaf network using multiple encryption algorithms. Persons skilled in the art may appreciate that the present invention can be practiced by other than the described embodiments, which are presented for purposes of illustration rather than of limitation. The present invention is limited only by the claims that follow.

What is claimed is:

1. A method of validating a data transmission pathway between two organizations across a spine-leaf network using two or more cryptographic algorithms encrypting data that includes spatial computing telemetry, the method comprising:

receiving, at a first processor of a first organization, a first data set from a first party when the first party requests from the first organization to transmit a second data set from the first organization to a second organization;

encrypting, using the first processor to run a first encryption algorithm, the first data set into a first hash value;

encrypting, using a second processor of a second organization to run a second encryption algorithm, a third data set into a second hash value when the first party requests from the first organization to transmit the second data set from the first organization to the second organization;

validating, using a third processor operating in the spine-leaf network, an integrity of the data transmission pathway by comparing the first hash value to the second hash value to see if they are equivalent, wherein:

the third processor uses generative AI to extract information related to a source and a destination and provide an optimal route for a transaction;

the source is a spatial computing device used by the first party and a first entity; and the destination is a second entity;

when the first hash value and the second hash value are equivalent, transmitting over the spine-leaf network, using the third processor, the second data set; wherein:

the data transmission pathway is an end-to-end data transmission pathway wherein selected functionality in the spine-leaf network is kept at communication endpoints that communicate through the spine-leaf network;

the first data set comprises telemetry relating to use of the spatial computing device by the first party;

the first data set and the third data set are used to validate the data transmission pathway between the first organization and the second organization over the spine-leaf network; and the second data set comprises data not included in the first data set.

2. The method of claim 1 wherein:

the first encryption algorithm and the second encryption algorithm are implemented using a Homomorphic Serpent Blockchain (HSB) algorithm framework that combines homomorphic encryption and serpent encryption.

3. The method of claim 1 wherein:

the third data set is obtained from a distributed ledger blockchain that contains telemetry data relating to the first party, wherein the telemetry data comprises IP address, spatial interaction telemetry, spatial map, and spatial device attributes; and the third data set comprises the first data set.

4. The method of claim 1 wherein the data transmission pathway is used to process a transaction and the second data set comprises spatial computing telemetry related to an end-to-end transaction between the first organization and the second organization, wherein a transaction payload is integrated with spatial computing telemetry generated for a defined spatial session window.

5. A system for validation of a data transmission pathway between two organizations across a spine-leaf network with use of two or more cryptographic algorithms encrypting data related to spatial computing telemetry, the system comprising:

a first processor of a first organization;

a second processor of a second organization;

a spine-leaf network;

a third processor operating in the spine-leaf network;

wherein:

the first processor is configured to:

receive a first data set from a first party when the first party requests from the first organization to transmit a second data set from the first organization to a second organization;

run a first encryption algorithm to encrypt the first data set into a first hash value;

the second processor is configured to:

run a second encryption algorithm to encrypt a third data set into a second hash value when the first party requests from the first organization to transmit the second data set from the first organization to the second organization;

the third processor is configured to:

validate an integrity of the data transmission pathway by comparing the first hash value to the second hash value to see if they are equivalent, wherein:

the third processor uses generative AI to extract information related to a source and a destination and the third processor provides an optimal route for a transaction;

the source is a spatial computing device used by the first party and a first entity; and the destination is a second entity;

transmit the second data set when the first hash value and the second hash value are equivalent;

the data transmission pathway is an end-to-end data transmission pathway wherein selected functionality in the spine-leaf network is kept at communication endpoints that communicate through the spine-leaf network;

the first data set comprises telemetry relating to use of the spatial computing device by the first party;

the first data set and the third data set are used to validate the data transmission pathway between the first organization and the second organization over the spine-leaf network; and the second data set comprises data not included in the first data set.

6. The system of claim 5 wherein:

the first encryption algorithm and the second encryption algorithm are implemented using a Homomorphic Serpent Blockchain (HSB) algorithm framework that combines homomorphic encryption and serpent encryption.

7. The system of claim 5 wherein:

the third data set is obtained from a distributed ledger blockchain that contains telemetry data relating to the first party, wherein the telemetry data comprises IP address, spatial interaction telemetry, spatial map, and spatial device attributes; and the third data set comprises the first data set.

8. The system of claim 5 wherein the data transmission pathway is used to process a transaction and the second data set comprises spatial computing telemetry related to an end-to-end transaction between the first organization and the second organization, wherein a transaction payload is integrated with spatial computing telemetry generated for a defined spatial session window.

* * * * *